(12) United States Patent
Makke et al.

(10) Patent No.: US 10,798,104 B2
(45) Date of Patent: Oct. 6, 2020

(54) NETWORKED COMMUNICATIONS CONTROL FOR VEHICLES

(71) Applicant: Ford Global Technologies, LLC, Dearborn, MI (US)

(72) Inventors: Omar Makke, Lyon Township, MI (US); Jalal Mohammed Makke, West Bloomfield Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 189 days.

(21) Appl. No.: 15/871,616

(22) Filed: Jan. 15, 2018

(65) Prior Publication Data
US 2019/0222581 A1 Jul. 18, 2019

(51) Int. Cl.
G06F 17/00 (2019.01)
H04L 29/06 (2006.01)
H04L 29/08 (2006.01)

(52) U.S. Cl.
CPC ........ H04L 63/105 (2013.01); H04L 63/0236 (2013.01); H04L 63/20 (2013.01); H04L 67/12 (2013.01)

(58) Field of Classification Search
CPC ... H04L 63/105; H04L 63/0236; H04L 63/20; H04L 67/12
See application file for complete search history.

(56) References Cited

U.S. PATENT DOCUMENTS

| 5,406,091 A * | 4/1995 | Burba | H04B 10/802 250/551 |
|---|---|---|---|
| 8,739,156 B2 | 5/2014 | Frank | |
| 8,769,172 B2 | 7/2014 | Soffer et al. | |
| 2005/0010765 A1* | 1/2005 | Swander | H04L 63/20 713/166 |
| 2007/0146011 A1* | 6/2007 | O'Mahony | H03K 5/156 326/93 |
| 2008/0304499 A1* | 12/2008 | Jeon | H04L 12/66 370/401 |
| 2010/0127193 A1* | 5/2010 | Abernathy | H04L 12/40032 250/551 |
| 2010/0287616 A1* | 11/2010 | Yang | G06F 21/56 726/24 |
| 2011/0033190 A1* | 2/2011 | Veilleux, Jr. | G02B 6/4284 398/117 |
| 2012/0139495 A1* | 6/2012 | Nortman | H02J 7/0016 320/128 |
| 2013/0336120 A1* | 12/2013 | Bai | G08G 1/161 370/235 |

(Continued)

FOREIGN PATENT DOCUMENTS

WO WO2017038500 A1 * 8/2016
WO 2017046789 A1 3/2017

*Primary Examiner* — John B King
*Assistant Examiner* — Darshan I Dhruv
(74) *Attorney, Agent, or Firm* — Michael Spenner; Brooks Kushman, P.C.

(57) ABSTRACT

A vehicle includes a lower security network (LSN) and higher security network (HSN) having therebetween a read only filter and path in parallel to respectively exclusively pass data from the LSN to the HSN, and from the HSN to the LSN. The vehicle includes a gateway controller configured to alter a duty cycle associated with the filter according to utilization of the HSN to alter a data rate through the filter but not through the path.

4 Claims, 3 Drawing Sheets

(56) References Cited

U.S. PATENT DOCUMENTS

| | | | |
|---|---|---|---|
| 2014/0032800 A1* | 1/2014 | Peirce | H04L 63/0227 710/105 |
| 2014/0215491 A1* | 7/2014 | Addepalli | H04W 4/00 719/313 |
| 2014/0336623 A1* | 11/2014 | Van Rens | H04L 7/0008 604/528 |
| 2015/0020152 A1* | 1/2015 | Litichever | H04L 63/08 726/1 |
| 2016/0294707 A1* | 10/2016 | Chen | H04L 67/12 |
| 2018/0124121 A1* | 5/2018 | Blocher | H04L 63/02 |
| 2018/0257662 A1* | 9/2018 | Ishigooka | B60R 16/0231 |
| 2018/0302237 A1* | 10/2018 | Sarabia | H04L 63/08 |
| 2019/0007234 A1* | 1/2019 | Takada | H04L 12/46 |
| 2020/0015075 A1* | 1/2020 | Takatsuka | H04L 63/101 |

* cited by examiner

NETWORKED COMMUNICATIONS CONTROL FOR VEHICLES

TECHNICAL FIELD

The present disclosure relates to networked communications control for vehicles.

BACKGROUND

Vehicles may include an internet-facing network and a controller-area network. The two networks may be air gapped to prevent malicious content residing on the internet-facing network from reaching the controller-area network, resulting in the controller-area network being unable to utilize valuable user input and data residing on the internet-facing network.

SUMMARY

A vehicle includes a lower security network (LSN) and higher security network (HSN) having therebetween a read only filter and path in parallel to respectively exclusively pass data from the LSN to the HSN, and from the HSN to the LSN. The vehicle includes a gateway controller configured to alter a duty cycle associated with the filter according to utilization of the HSN to alter a data rate through the filter but not through the path.

A method includes, by a gateway controller, altering a duty cycle associated with a read only filter, between a lower security network (LSN) and higher security network (HSN) having therebetween the filter and a path in parallel to respectively exclusively pass data from the LSN to the HSN. The alteration is according to utilization of the HSN to alter a data rate through the filter but not through the path.

A method includes, by a gateway controller, altering a duty cycle corresponding with a clock rate of a read only filter, between a lower security network (LSN) and higher security network (HSN) of a vehicle having therebetween. The filter and a path are in parallel to respectively, exclusively pass data from the LSN to the HSN. The alteration is according to utilization of the HSN such that a data rate through the filter is altered but not through the path.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may be enabled to bridge the air gap through mask rom and other information control methods. For example, mask rom may be placed between a lower security network (LSN) and a high security network (HSN) to control data flow between the networks. Additionally, unfettered monodirectional data may be passed from the HSN to the LSN. Meaning, data flow is restricted when entering HSNs but unencumbered when leaving HSNs. Indeed, data flow control can enable two-way communication between LSNs and HSNs without sacrificing confidentiality, integrity, and availability of the HSN.

Figure 1:
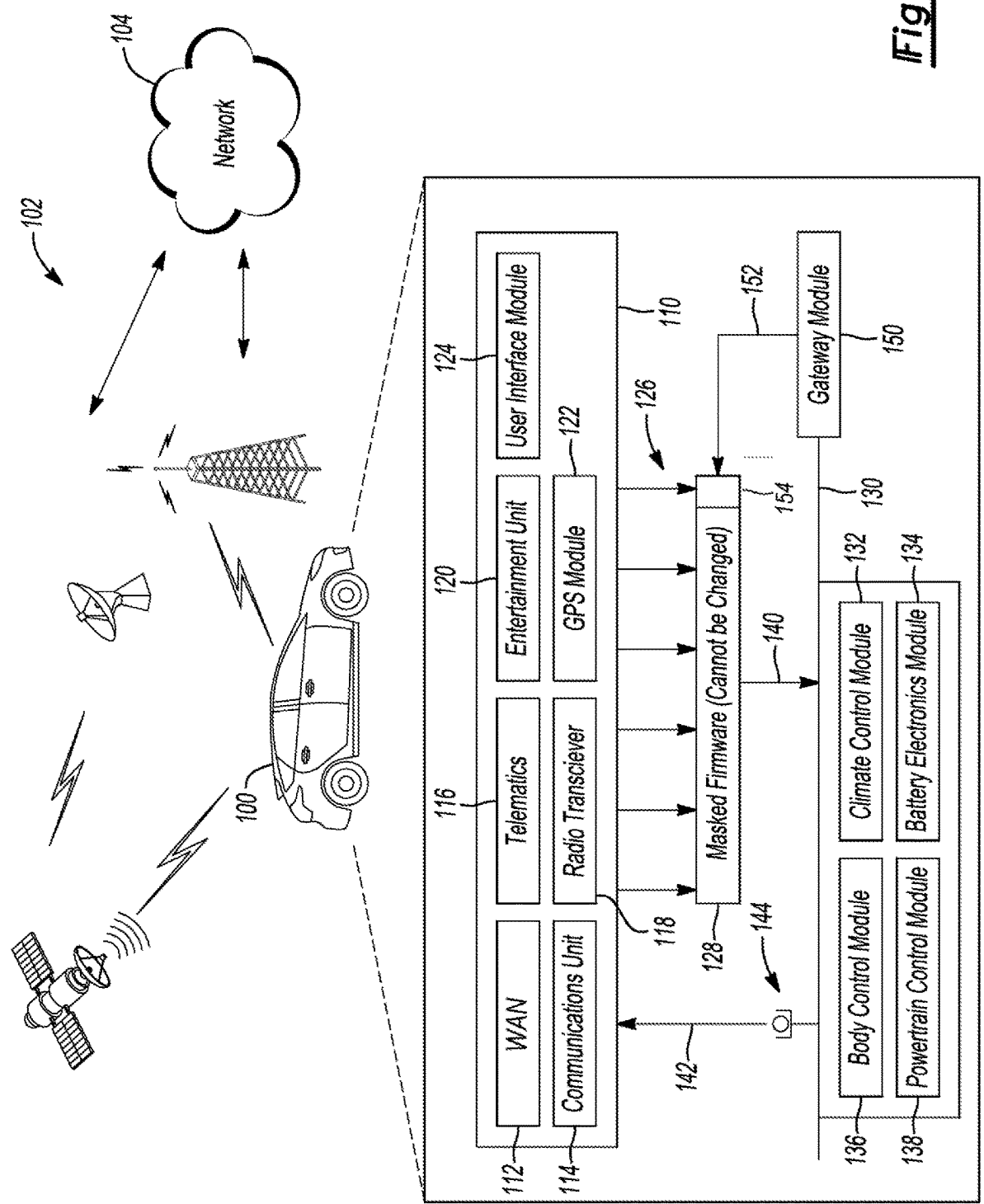
FIG. 1 is an overview of a vehicle communication system.

Referring to FIG. 1, a vehicle 100 is shown. The vehicle 100 is connected to communications infrastructure 102. The communications infrastructure 102 enables access to a network 104. The network 104 may be the Internet. The network 104 may provide vehicle communications modules with information. For example, WAN access 112 may be available on the LSN 110.

The LSN 110 includes communications modules. The modules may be a combination of software and hardware to provide the specified function. The LSN 110 may include a communications unit 114 for providing access to the WAN through hardware and software of the communications unit 114 and the radio transceiver 118. The LSN 110 may include a telematics unit 116, which may include trailer tracking, container tracking, vehicle tracking, fleet management, or other functions. The LSN 110 may include an entertainment unit 120 for providing hardware and software that displays location data from the GPS module 122 or other audio and visual entertainment. The LSN 110 may include a user interface module 124 for supplying a human-machine interface between the vehicle systems and the user. Other modules may be included with the LSN 110 as technology changes and develops. For example, passenger devices may be allowed to access the LSN such that information and input is available to passengers through their personal devices (e.g., cellular phones, tablet computers). The LSN 110 may transfer any communications protocols including internet protocol (IP) or transmission control protocol (TCP).

FIG. 1 also discloses an HSN 130. The HSN 130 may include various modules for controlling the vehicle. The HSN 130 may include a climate control module 132. The climate control module 132 may control the operation of the heating, ventilation, and cooling of the vehicle. The climate control module may control compressors, coolant, dampers, or other aspects necessary to provide the requisite temperature to the passengers of the vehicle. The HSN may include a battery electronics module (BECM) 134. The BECM 134 may control power availability of vehicle batteries on hybrid vehicles or manage battery charge. The HSN 130 may include a body control module 136. The body control module 136 may control various vehicle lighting or door systems. For example, the body control module 136 may control the headlights and brake lights. The HSN 130 may include a powertrain control module 138. The powertrain control module 138 may control the drive systems of the vehicle 100. For example, the powertrain control module 138 may control vehicle acceleration or decide whether to propel the vehicle from an internal combustion engine, a battery pack, or a combination thereof. The HSN 130 may transfer any communications protocols include internet protocol (IP) or transmission control protocol (TCP), and the HSN may also communicate using the controller area network (CAN) protocol.

A read only filter 128 may be placed between the LSN 110 and the HSN 130. Meaning, information on the LSN 110 can only flow to the HSN 130 if it is included in a predetermined set of instructions enabled by the filter 128 or is otherwise enabled. The filter 128 may be any combination of writeable and read only memory available. The read only portion of the filter may be mask ROM. The filter may be implemented on any OSI layer.

The filter 128 may have a read only portion such that all communications from the LSN 110 and the HSN are predetermined. The filter 128 may have a rewriteable portion such that communication requests recognized by the filter 128 from the LSN 110 are updated through authorized or signed communications.

The read only portion of the filter 128 may have a predetermined set of instructions designed to receive information from the rewriteable portion and generate messages on the HSN 130. For example, the filter 128 may receive or listen for communications on the LSN 110. The communication may be matched to a communication request recognized by the filter 128.

The rewriteable portion of the filter 128 may send these communication requests to the read only portion of the filter 128 using a digital output. Meaning, a set of registers is updated on the read only portion by a TRUE or FALSE bit. When particular bits on the register of the read only portion are TRUE, the read only portion of the filter 128 sends communications on the HSN 130. For example, the register may correspond to a predetermined set of instructions for creating a HSN protocol message. Meaning, the user interface module 124 may send a communications request on the LSN 110 to increase the temperature via the climate control module 132. The communications request may be received by the filter 128 as an IP packet and recognized by the rewritable portion of the filter 128. The rewritable portion of the filter 128 may send digital outputs to write registers on the read only portion of the filter 128 corresponding to an increase in temperature and the amount of the increase. The read only portion of the filter 128 recognizes these register inputs and sends communications on the HSN 130 corresponding to the user's request. The communications sent may be packaged as a CAN message recognizable by the climate control module of the HSN. Thus, only a predetermined set of instructions are sent on the HSN 130, preventing losses in the confidentiality, integrity, and availability of the HSN 130.

Figure 2:
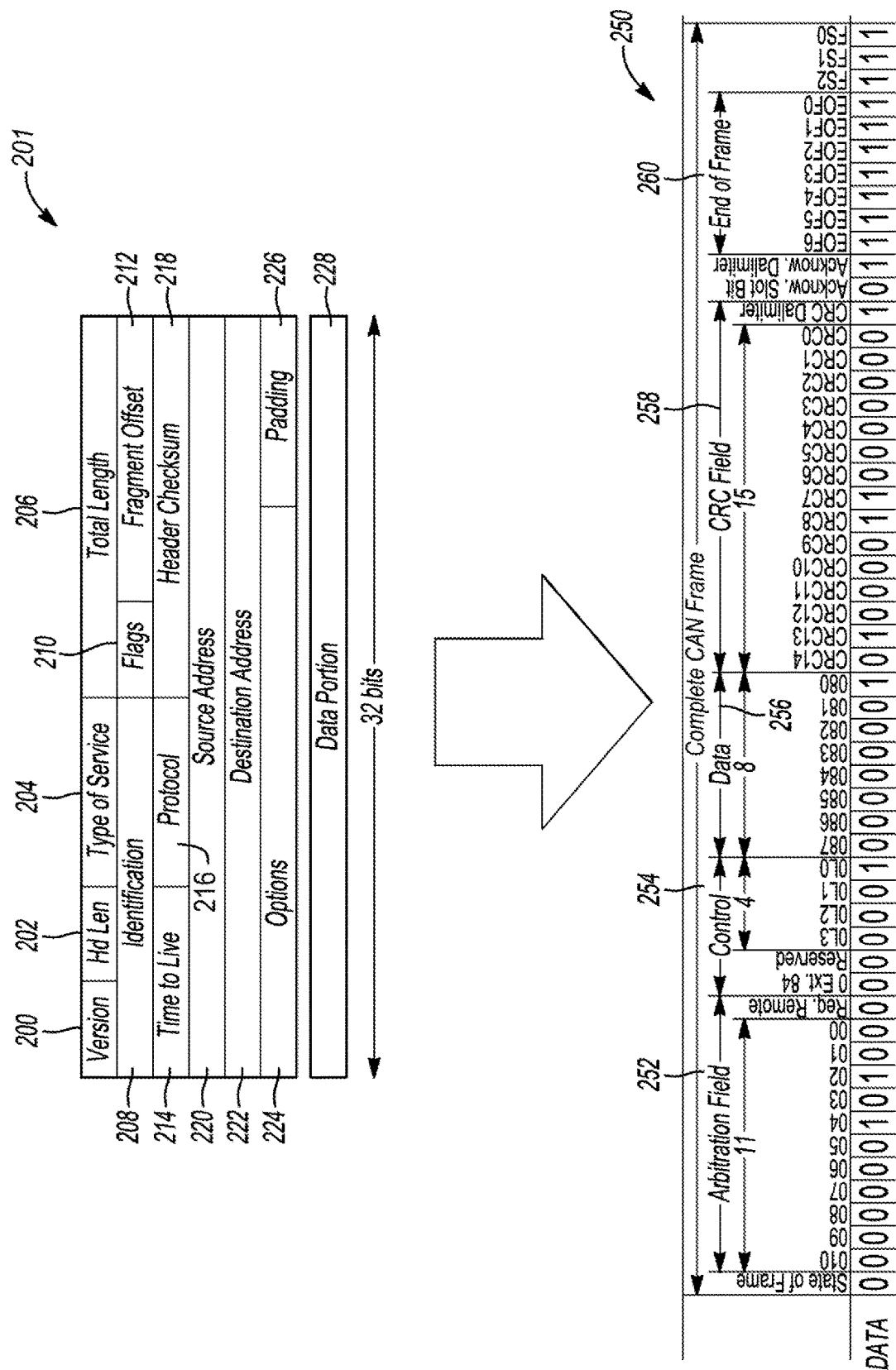
FIG. 2 is an example of repackaging data by the read only filter.

The rewriteable portion of the filter 128 may send these communication requests to the read only portion of the filter 128 using a communications protocol. Meaning, once a communication request is recognized by the filter 128, the packet received by the rewriteable portion of the filter 128 is stripped of its IP header and communication request information, and the raw data packet is repackaged as an HSN 130 communication protocol (e.g., CAN frame), as shown in FIG. 2. Thus, the read only filter strips a payload from a packet on the LSN 110 and repackages the payload with a HSN protocol, preventing losses in the confidentiality, integrity, and availability of the HSN 130.

It should be appreciated that any modules may be included on either the LSN or HSN. The LSN and HSN are designations indicating an information control solution. The particular modules suggested may or may not be present or may be located on networks having different security levels. For example, portions of the user interface module 124 may be partitioned such that a user could interface with the climate control module 132 on the HSN 130. Another partition of the user interface module 124 may allow interaction with the entertainment unit. Meaning, specific designations and naming conventions of modules may distract from the data flow portions of this disclosure. Thus, any module or portion thereof may be on either network 110, 130; however, data from the LSN 110 to the HSN 130 flows through the filter 128.

The read only portion of the filter 128 may include a clock 154. The clock controls the execution of data being placed on the HSN 130. Meaning, as the clock frequency increases, more data transmissions are sent from the filter 128 to the HSN 130. A gateway module 150 may monitor utilization of the HSN 130. For example, the gateway module 150 may monitor a span port of the HSN 130 to measure the amount of traffic on the HSN 130. The gateway module 150 sends a control signal 152 to the read only portion of the filter 128. The control signal 152 may be a duty cycle or digital communication prescribing the clock rate of the clock 154. Indeed, the control signal 152 prescribes the network transmission rate of the filter 128 such that denial of service or other overly burdensome communications are prevented on the HSN.

The network topology of FIG. 1 may include a path 142 in parallel with the filter 128. The path 142 may be a monodirectional communications path implemented on any OSI layer. The path 142 may transmit communications from the HSN 130 to the LSN 110 only. Thereby ensuring augmented bidirectional communications between the LSN 110 and HSN 130. Translation may be provided to convert CAN protocol messages on the HSN 130 to TCP/IP messages on the LSN 110. The path 142 may be fiber optic. The path 142 may be opto-isolated to prevent communications from the LSN 110 to the HSN 130.

Referring to FIG. 2, an IP datagram 201 and a CAN datagram are shown. The IP datagram 201 includes a header including version 200, header length, 202, type 204, total length 206, identification 208, flags 210, fragment offset 212, time to live 214, protocol 216, checksum 218, source address 220, destination address 222, options 224, and padding 226, and a data portion 228. The rewritable portion of the filter 128 may be configured to recognize portions of the IP datagram 201 as indicative of a requested transmission. For example, the destination address may be the filter 128 itself. The data portion 228 may be parsed by the filter 128 for valid hashes that indicate a communications request as well. Other methods may be used to determine whether communications are requested. Responsive to recognizing a valid request, the rewriteable portion of the filter 128 may send payload information or Boolean outputs to activate the read only portion of the filter 128. A combination of both payload transfer and Boolean outputs may be used as described above. If the entire payload of the IP datagram 201 is requested to be sent, the data portion 228—or a portion thereof—may be sent to the read only portion of the filter 128. The read only portion of the filter may strip destination information from the data portion 228 of the payload and rewrite the control 254 and arbitration field 252 of the CAN datagram 250. The remaining data from the data portion 228 may be put into the data section 256. As necessary, and according to the control signal 152, the data portion 228 may be broken into multiple CAN messages 250. An extended frame CAN format may be used as well.

Figure 3:
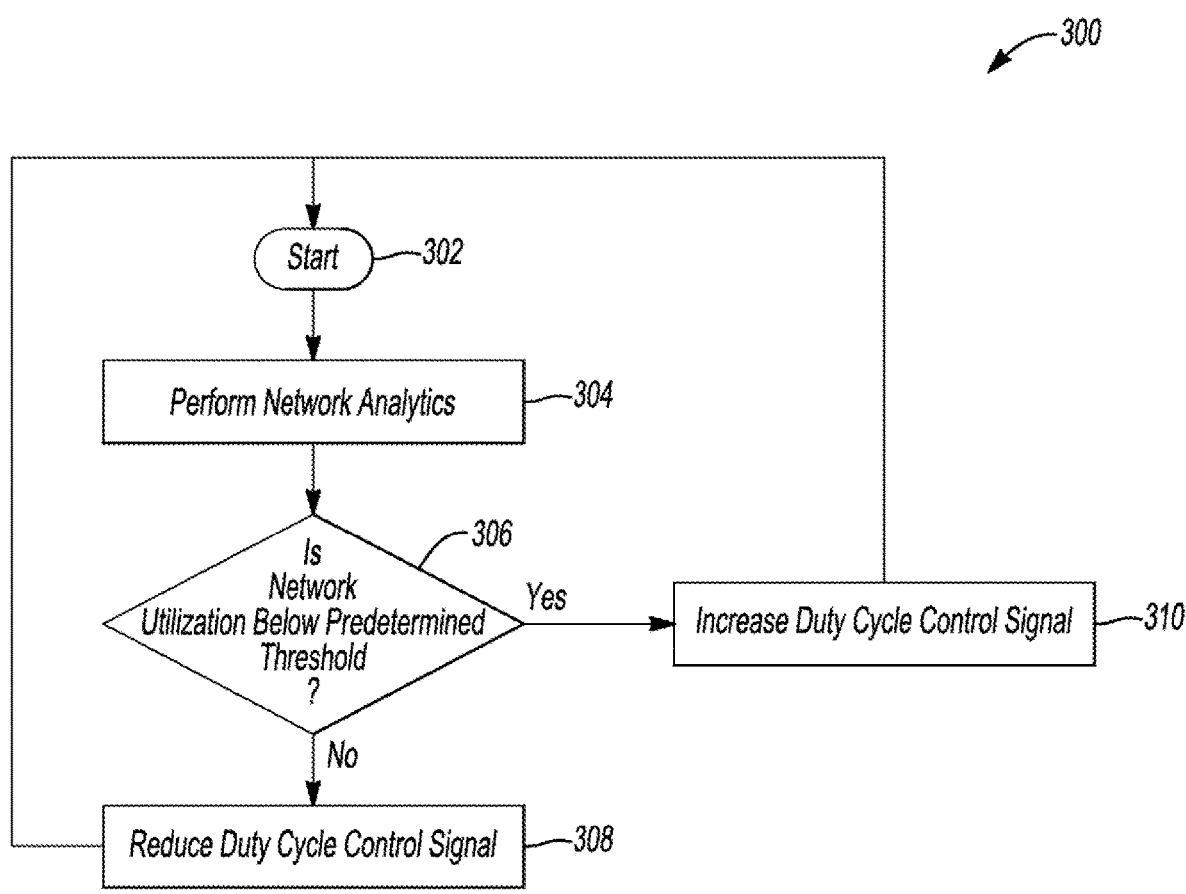
FIG. 3 is an algorithm for altering network utilization of the HSN.

Referring to FIG. 3 is an algorithm 300. The algorithm 300 begins in step 302. In step 304, network analytics are performed to determine quality of service or network utilization. This analysis may include the amount of traffic and the amount of collisions on the network. In step 306, the controller determines whether the network utilization is below a predetermined threshold. The predetermined threshold may be variable. The predetermined threshold may be less than 100% of network utilization. The predetermined threshold may be set based on vehicle 100 operating conditions. For example, the predetermined threshold may be lowered during startup and shutdown. If the network utilization is below the predetermined threshold the controller may increase the duty cycle control signal 152 in step 310. If the network utilization is above the predetermined threshold, the controller may reduce the duty cycle of the control signal 152.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a read only filter arranged between a lower security network (LSN) and a higher security network (HSN), wherein the read only filter receives communication requests from the LSN and sends a corresponding instruction to the HSN, the corresponding instruction including a predetermined set of instructions based on the communication requests from the LSN, wherein the read only filter strips a payload from the communication requests on the LSN and repackages the payload with a HSN protocol in the predetermined set of instructions;
   a monodirectional path arranged parallel to the read only filter and configured to exclusively pass data from the HSN to the LSN, wherein the read only filter includes mask read only memory (ROM); and
   a gateway controller configured to
      monitor an amount of data traffic at the HSN,
      in response to the amount of data traffic at the HSN exceeding a predefined amount of traffic, alter a duty cycle associated with the read only filter according to utilization of the HSN to alter a data rate through the filter but not through the monodirectional path.

2. The vehicle of claim 1, wherein the duty cycle corresponds to a clock rate of the filter.

3. The vehicle of claim 1, wherein the path is optoisolated.

4. The vehicle of claim 3, wherein the path is fiber optic.

* * * * *